(12) United States Patent
Andreev et al.

(10) Patent No.: US 6,553,370 B1
(45) Date of Patent: Apr. 22, 2003

(54) FLEXIBLE SEARCH ENGINE HAVING SORTED BINARY SEARCH TREE FOR PERFECT MATCH

(75) Inventors: Alexander E. Andreev, San Jose, CA (US); Ranko Scepanovic, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 237 days.

(21) Appl. No.: 09/679,313

(22) Filed: Oct. 4, 2000

(51) Int. Cl.[7] .............................................. G06F 17/30
(52) U.S. Cl. .......................................... 707/3; 707/101
(58) Field of Search .............................. 707/1, 10, 3, 8, 707/500, 512, 102, 5; 704/256, 257

(56) References Cited

U.S. PATENT DOCUMENTS

| | | | | |
|---|---|---|---|---|
| 5,557,786 A | * | 9/1996 | Johnson, Jr. | 707/101 |
| 5,799,299 A | * | 8/1998 | Fujiwara | 707/3 |
| 6,047,283 A | * | 4/2000 | Braun | 707/3 |

OTHER PUBLICATIONS

M.V. Ramakriskna, "Hashing in Practice, Analysis of Hashing and Universal Hashing", Proceedings of the Conference on Management of Data, Association for Computing Machinery, 1988, pp 191–199.

T.H. Cormen et al., "Introduction to Algorithms", The MIT Press, McGraw Hill Book Company, 1989, Chapter 14 "Red–Black Trees", pp 263–280.

V. Srinivasan et al., "Fast Address Lookups Using Controlled Prefix Expansion", ACM Proceedings on Computer Systems, vol. 17, No. 1, Feb. 1999, pp 1–40.

\* cited by examiner

*Primary Examiner*—Jean M. Corrielus
*Assistant Examiner*—Fred Ehichioya
(74) *Attorney, Agent, or Firm*—Westman, Champlin & Kelly

(57) ABSTRACT

A binary search tree is structured so that keys or addresses associated with data in the bottom vertices are arranged in a predetermined order, such as ascending key address order. The root vertex and each hierarchy vertex contains the lowest value key from each child vertex and are thus similarly arranged by key value order. Each vertex of each level contains at least k and no more than 2k-1 keys, where k is an integer $\leq 2$ and is constant for all vertices of a given level, but may vary between levels. The result is a structured tree having equal path lengths between the root vertex and each bottom vertex for search purposes. Keys are deleted and inserted to the bottom vertices by restructuring the tree under control of computer instructions.

27 Claims, 6 Drawing Sheets

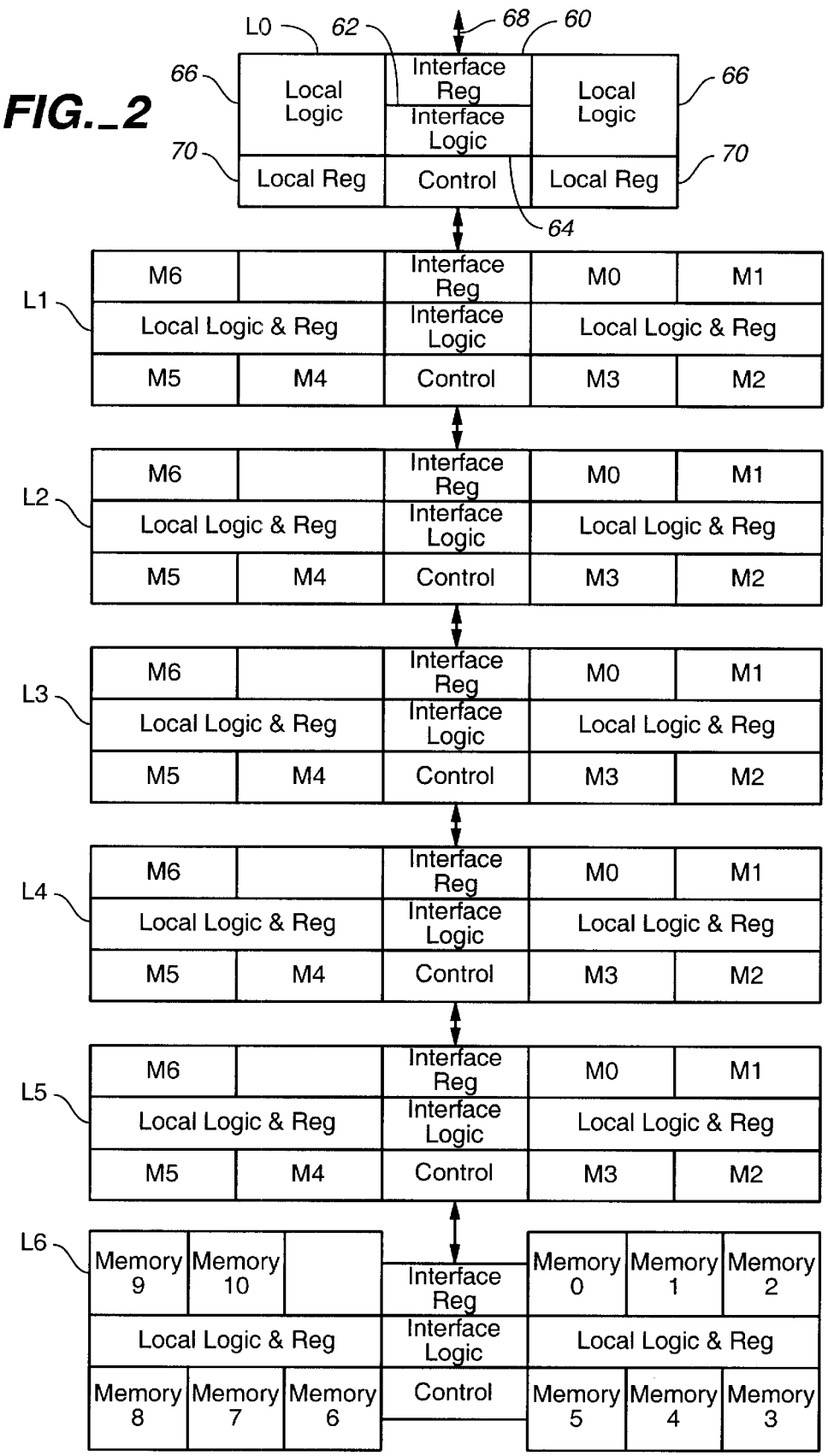
FIG._2

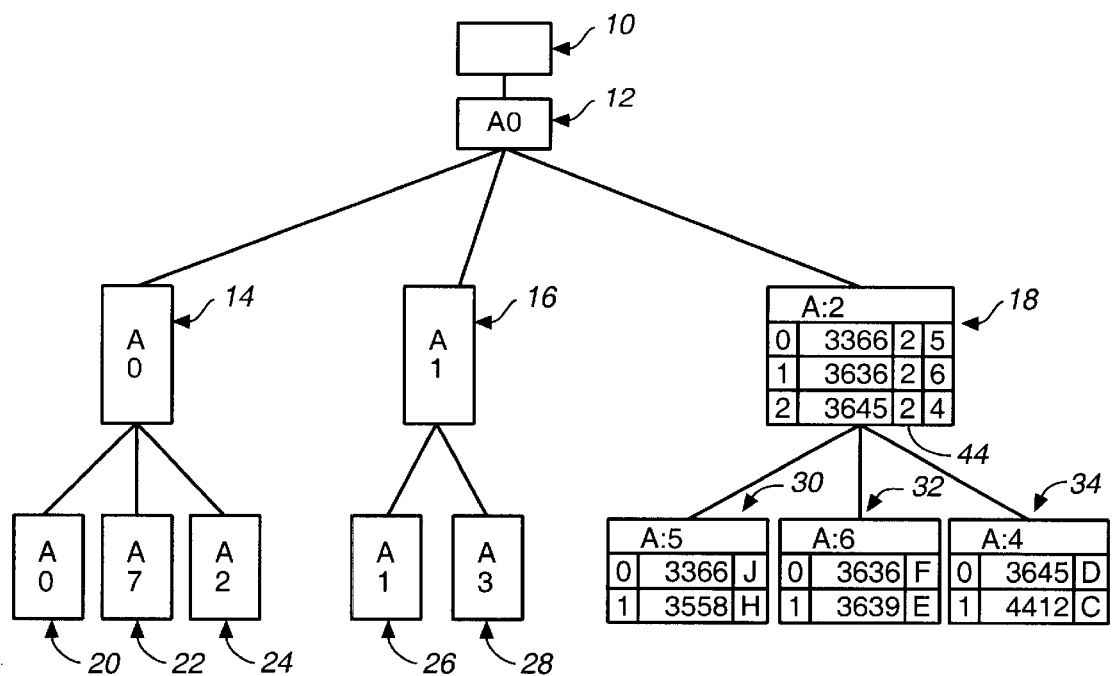
FIG._3
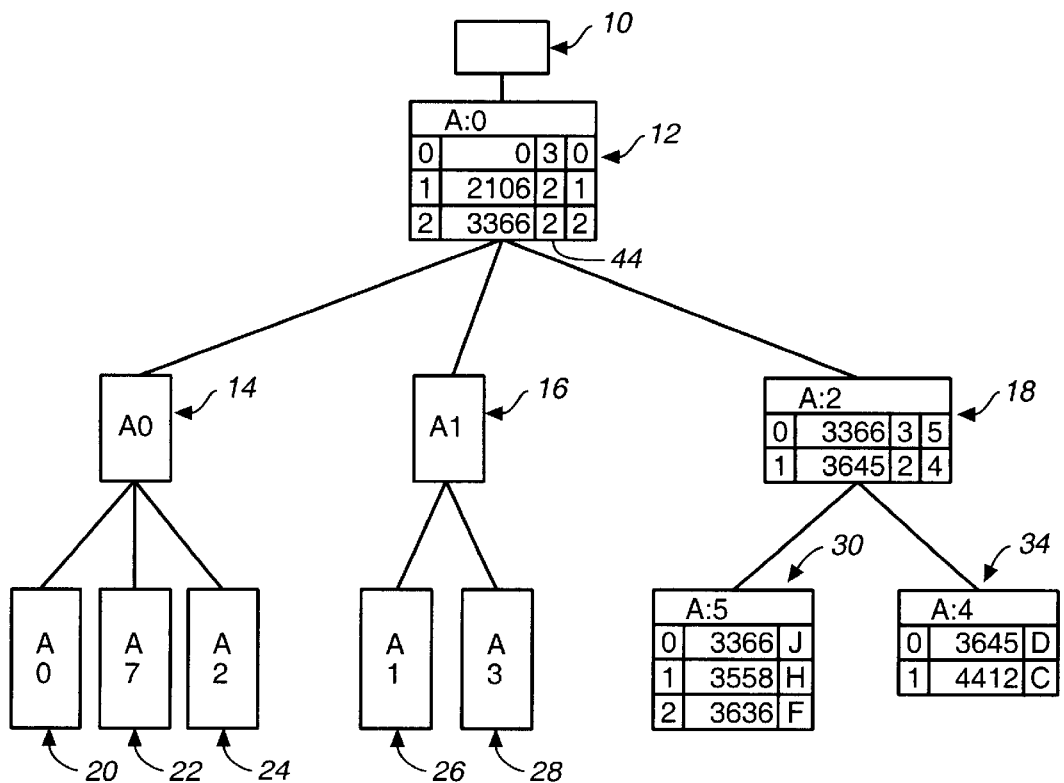
FIG._4

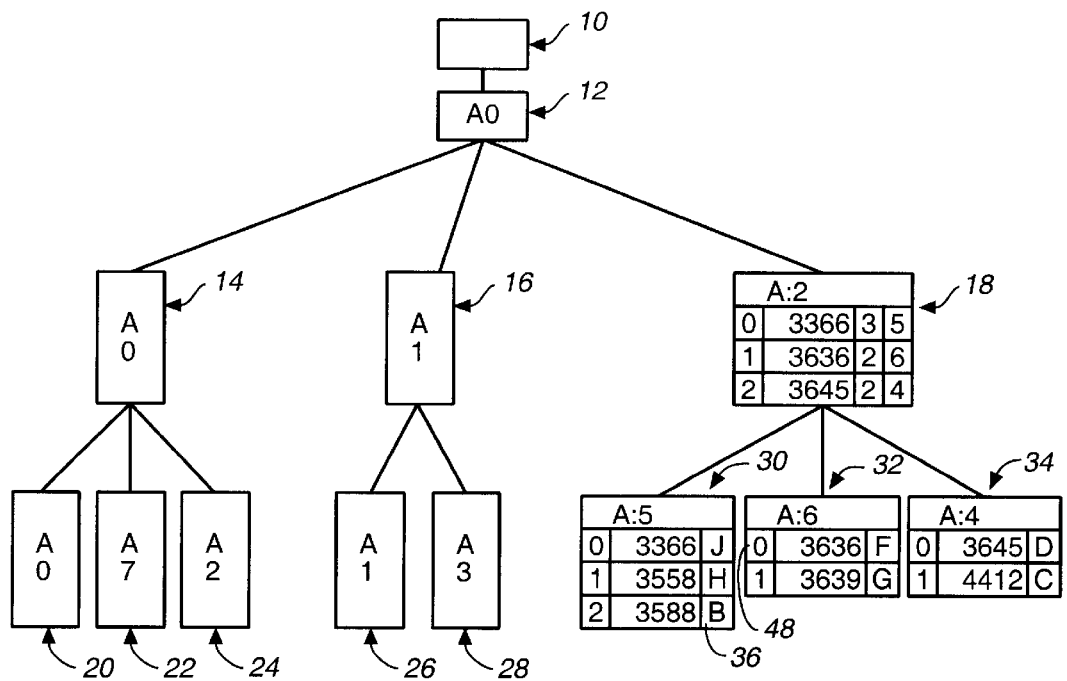
FIG._5
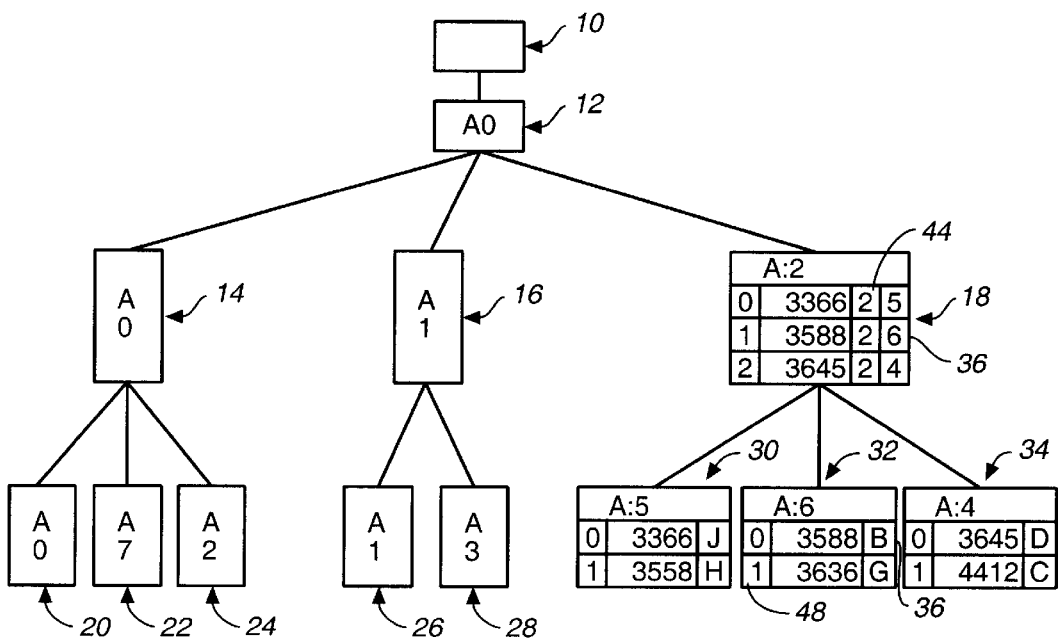
FIG._6

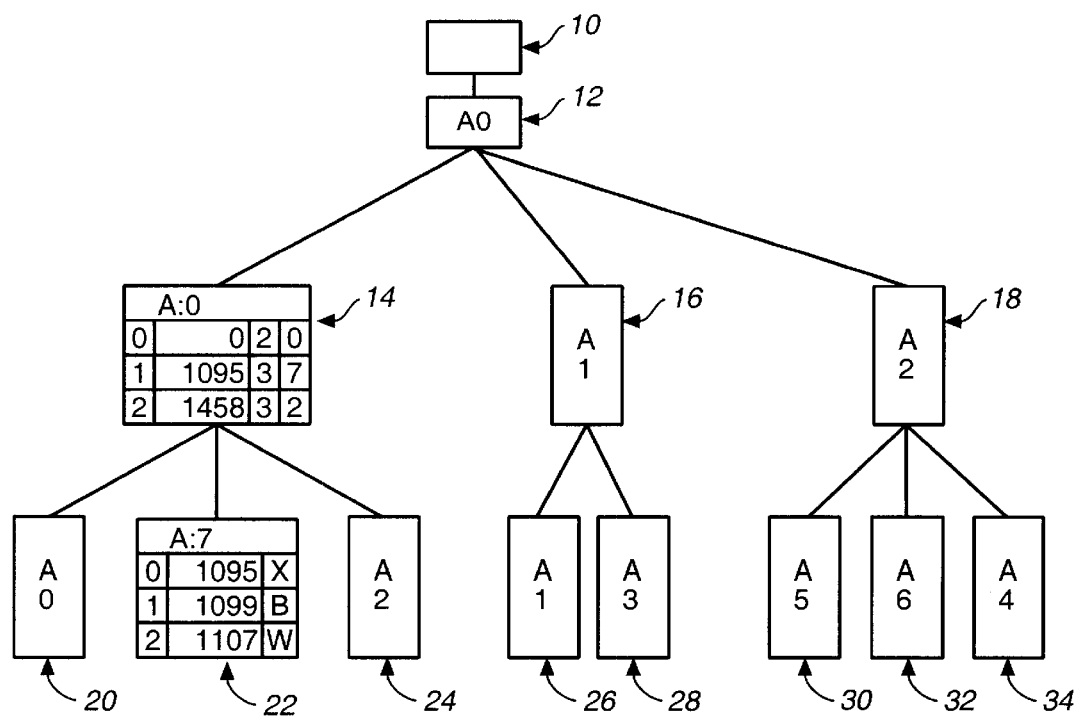
FIG._7
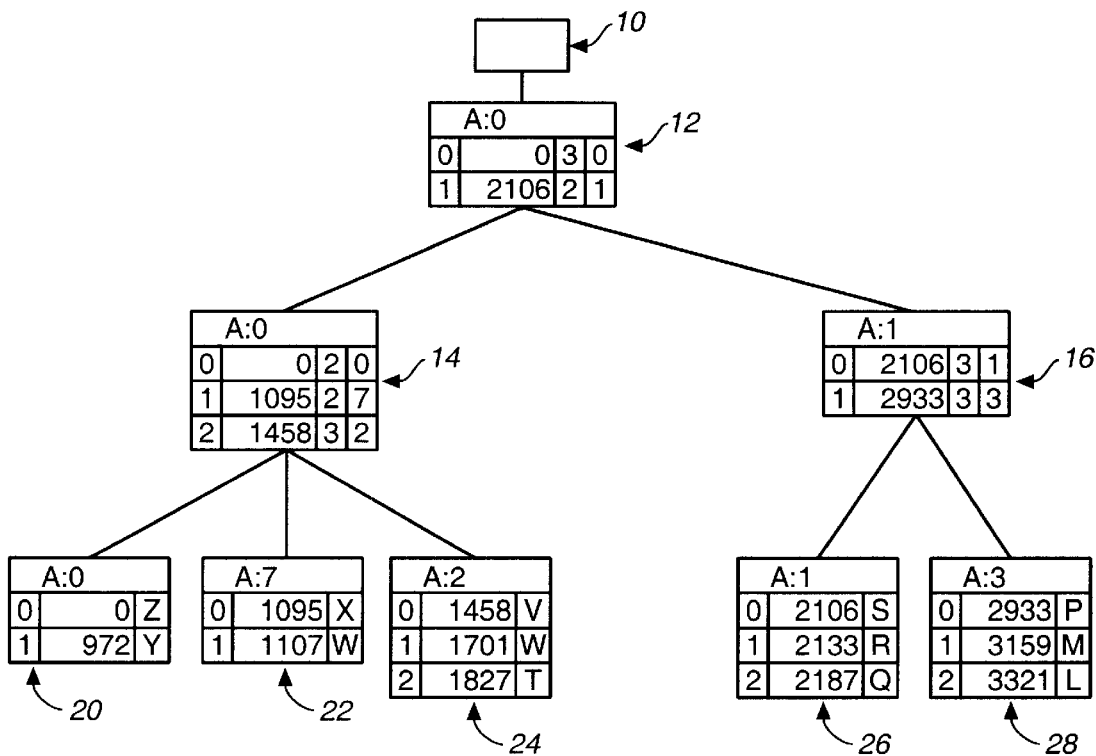
FIG._8

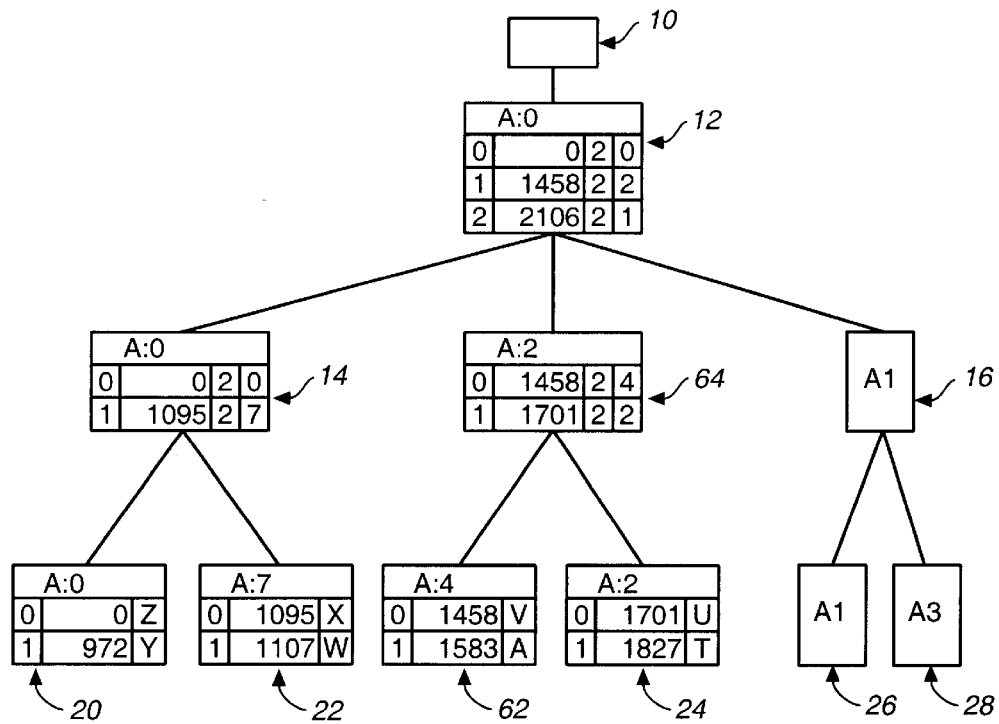
FIG._9
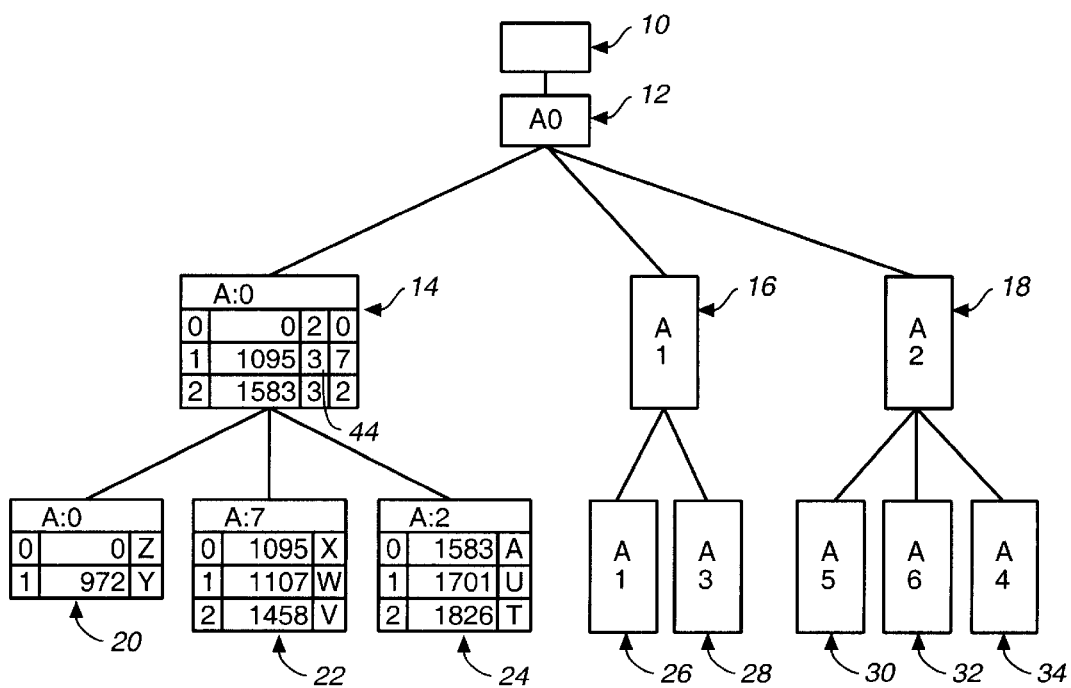
FIG._10

FLEXIBLE SEARCH ENGINE HAVING SORTED BINARY SEARCH TREE FOR PERFECT MATCH

CROSS-REFERENCE TO RELATED APPLICATIONS.

This application is related to application Ser. No. 09/679,209 filed on Oct. 4, 2000 for "Fast Flexible Search Engine for Longest Prefix Match" by Alexander E. Andreev and Ranko Sepanovic and assigned to the same assignee as the present invention.

BACKGROUND OF THE INVENTION

This invention relates to search engines for searching large tables of data, and particularly to search engines used for perfect matching to keys and addresses.

Lookup procedures are a major source of bottlenecks in high performance compilers and routers. One type of lookup procedure is known as the perfect match lookup, technique. Perfect match lookups techniques are used in various compilers such as compilers used in designing: semiconductor and integrated circuit chips, and in networking applications such as Internet address (URL) lookup in high performance data routers where large search tables or databases are employed. Searching large tables or databases requires increased time or hardware requirements, or both, resulting in more expensive systems in terms of increased search delays and larger memories. Problems associated with such lookups increase with the size of the search tables or databases, increases in traffic, and introduction of higher speed links. Moreover, perfect key or address matching is particularly challenging where large tables must be searched for the perfect match of the key or address.

In the past, perfect match lookups were performed using hash tables. The principal disadvantage of the hashing approach is the unpredictability of the delay in performing a seek operation. Typically, longer addresses require more time than shorter addresses, rendering the seek delay unpredictable. Moreover, as the table size increases, the delay increases. While the delay may be minimized by employing larger memory for the hashing operation, the delay is nevertheless unpredictable.

More recently, certain data structures, such as content addressable memory (CAM), have been used because of their capability to handle lookup techniques. A search table containing entries of keys (addresses) and data is used with a mask such that an input key or query operates on the mask to lookup the associated key (address) of the sought-for data. While this technique is quite effective, hardware and processing requirements limit expansion of this technique as tables increase in size, or as traffic increases.

Balanced binary search tree architecture has been-proposed to establish a predictable delay in connection with the searching operation. One particularly attractive balanced tree architecture is the red-black tree described by T. H. Corman et al. in "Introduction to Algorithms", published by The MIT Press, McGraw-Hill Book Company, 1989 in which an extra bit is added to each node to "balance" the tree so that no path is more than twice the length as any other. The red-black balanced binary tree architecture is particularly attractive because the worst-case time required for basic dynamic set operations is O(log n), where n is the number of nodes or vertices in the tree. The principal difficulty with balanced tree approaches is that complex rotations and other operations were required to insert or delete an entry to or from the tree to assure the tree complied with the balancing rules after insertion or deletion.

The present invention is directed to a data structure and a sorted binary search tree that inherits the favorable attributes of the balanced binary search tree, but provides simpler solutions for the insertion and deletion functions.

SUMMARY OF THE INVENTION

According to one aspect of the present invention, a binary search tree is structured so that keys associated with data are arranged in a predetermined order in the vertices of each level of the tree. The tree has a plurality of levels with a plurality of vertices in the bottom and at least one hierarchy level. A top level contains a root vertex defining an input to the tree. The keys are distributed through the vertices of each level in a predetermined order.

In one form of the tree, the keys are arranged in order of value, and the hierarchy and root vertices contain the one key from each respective child vertex having a minimum value. Thus, the bottom vertices are arranged in an order ascending from 1 to V, where V is an integer equal to the number of bottom vertices, and the keys in the bottom vertices are arranged so that values of the keys in any one bottom vertex are greater than values of the keys in all lower-ordered bottom vertices and are smaller than values of keys in all higher-ordered bottom vertices. The keys in the hierarchy vertices are similarly arranged.

Another aspect of the invention resides in a process for altering the binary search tree. The number of keys in at least one bottom level vertex is altered, such as by deleting or inserting a key. The number of keys remaining in the altered bottom level vertex is identified. If the number of remaining keys is less than k, where k is an integer $\geq 2$, such as where a key was deleted, the location of keys among the bottom vertices is adjusted until all bottom vertices contain no less than k keys. If the number of remaining keys is greater than 2k–1, such as where a key was inserted, a key is transferred from the adjusted bottom vertex to another bottom vertex until all bottom vertices contain no more than. 2k–1 keys.

Where a key is deleted from a vertex to leave less than k keys, a neighboring bottom vertex is identified that contains more than k keys and a key is transferred from the identified neighboring bottom vertex to the adjusted bottom vertex. If no bottom vertex is identified as containing more than k keys, the keys remaining in the adjusted bottom vertex are transferred to at least one neighboring bottom vertex so that the number of keys in the neighboring bottom vertex contain no more than 2k–1 keys. The bottom vertex from which the key was deleted is then itself deleted. Similarly, the locations of keys among the hierarchy vertices are adjusted until all hierarchy vertices contain no less than K keys, where K is an integer $\geq 2$. While K or k is constant for all vertices in a given level, they may be different for vertices of different levels.

Where a key is inserted into a bottom vertex causing the receiving vertex to contain more than 2k–1 keys, a neighboring bottom vertex is identified that contains less than 2k–1 keys and a key is transferred to-the neighboring bottom vertex from the bottom vertex containing the inserted key. If all neighboring bottom vertices contain 2k–1 keys, a new bottom vertex is created and key are transferred to the new bottom vertex from the bottom vertex containing the inserted key until the number of keys in the bottom vertices is between k and 2k–1. A similar process is employed to add new hierarchy vertices.

According to another aspect of the invention, a computer useable medium contains a computer readable program comprising code that defines the structured binary search tree and cause the computer to reconstruct the tree upon insertion and deletion of keys.

BRIEF DESCRIPTION OF THE DRAWINGS

FIG. 2 is a diagram illustrating memory allocation for a search tree of the type illustrated in FIG. 1.

FIGS. 3–6 are diagrams of the search tree illustrated in FIG. 1 illustrating processes for deleting an entry from the tree.

FIGS. 7–10 are diagrams of the search tree illustrated in FIG. 1 illustrating processes for inserting an entry to tree.

DETAILED DESCRIPTION OF THE PREFERRED EMBODIMENTS

Figure 1:
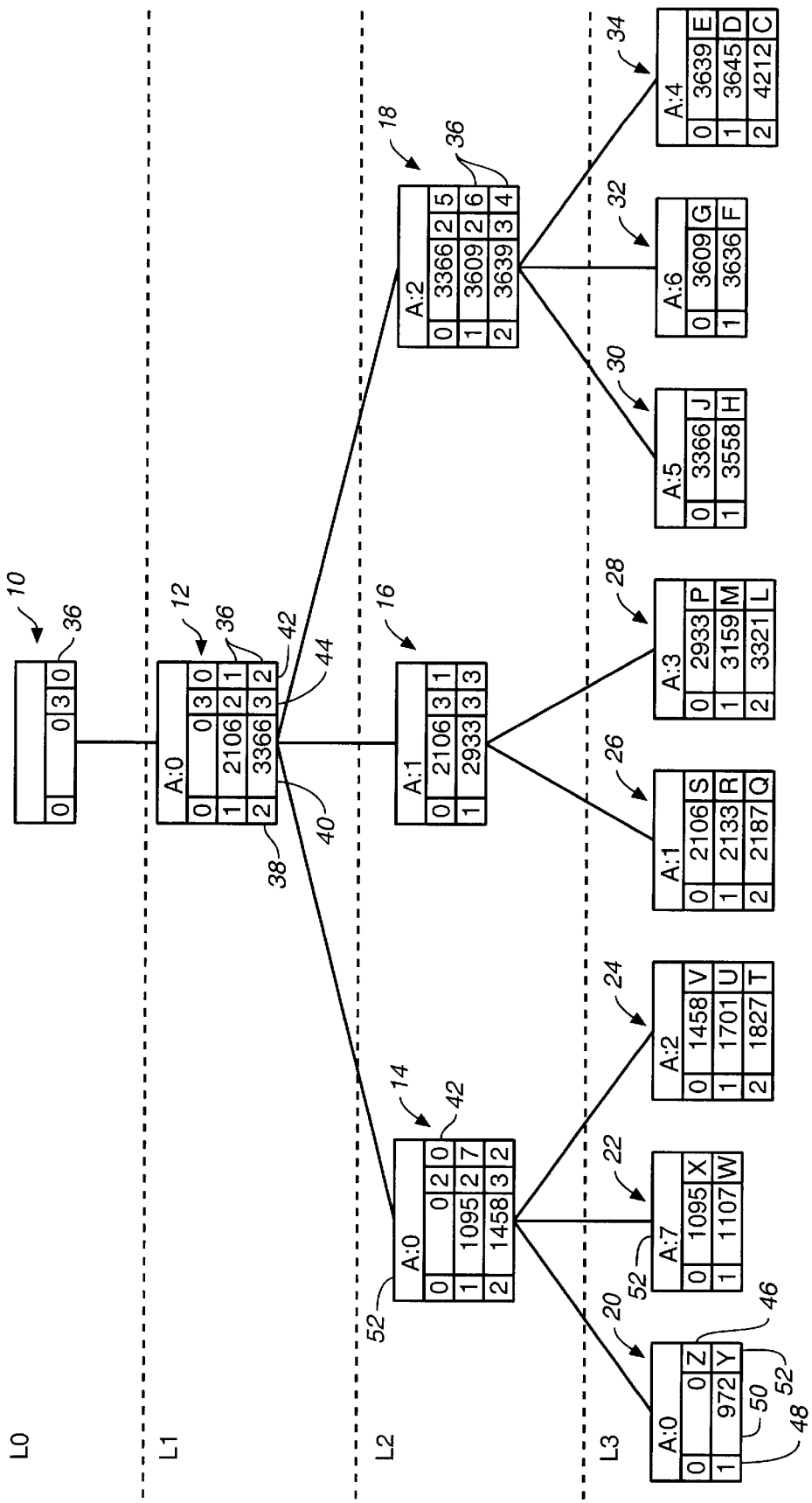
FIG. 1 is a diagram of a search tree in accordance with the presently preferred embodiment of the present invention.

FIG. 1 illustrates a binary search tree in accordance with the presently preferred embodiment of the present invention. The tree includes a root vertex or node 10 and a plurality of hierarchy vertices or nodes 12, 14, 16 and 18 arranged in a plurality of levels L0, L1 and L2. A fourth level, L3, contains a plurality of bottom vertices or leaves 20, 22, 24, 26, 28, 30, 32 and 34. While the search tree illustrated in FIG. 1 employs four levels, any number of levels may be employed, limited solely by the capacity of the memory in which the tree is stored. Increasing the number of levels increases the number of vertices in each path from the root vertex to each bottom vertex, and increases the capacity of the tree: and the search time. The vertices of level L3 are children to the vertices of level L2, which in turn are children to the vertices of level L1, which in turn is a child to root vertex 10 at level L0. Root vertex 10 is the entry point for searches to the tree.

Each hierarchy vertex 12, 14, 16, 18 includes a plurality of entries 36. Root vertex 10 has a single entry 36. Each entry 36 has an entry address 38 indicating its location in the root vertex, and includes a key field 40, a child vertex address field 42, and a designator field 44. The key is an address or key that is the same key or address in a child vertex. Hence, "3366" is a key that is also in vertex 18. As will be more fully understood hereinafter, the key in a root or hierarchy vertex is a minimum-ordered key in the respective child vertex. The entry address 38 is the address in the vertex for the key. Hence, entry address "2" in vertex 12 is the address for key "3366". The child vertex address 42 is the address of a child vertex in the next subordinate level. Thus, address "2" in field 42 is the address of child vertex 18 containing key "3366". The designator 44 designates the number of entries or keys in the child vertex. Thus, "3" at field 44 in vertex 12 indicates that child vertex 18 has three entries 36.

Each bottom vertex in level L3 includes a plurality of entries 46 located at respective entry addresses 48 in the bottom vertex. Each entry 46 includes a key field 50 and a corresponding data field 51. The key in field 50 is the key or address of the corresponding data in field 51. The entry address 48 is the address in the bottom vertex for the key. Hence, entry address "1" in vertex 20 is the address for key "972" and its associated data "Y".

Each hierarchy and bottom vertex, namely the vertices in levels L1, L2 and L3 in the example, has a vertex address 52 identifying its location in memory. The vertex address for each vertex is unique for the level, and is copied into field 42 of the parent vertex. Hence, vertex address "0" associated with vertex 20 appears in field 42 of the appropriate entry in parent vertex 14. The number of entries in the respective vertex appears in field 44 of the parent vertex. Thus, designator "2" in field 44 of the associated entry in vertex 14 indicates that child vertex 20 contains two entries. Root vertex 10 in level L0 is the entry vertex and does not require an address or a designator indicating the number of entries in the vertex.

In accordance with the present invention, the number of entries in any hierarchy or bottom vertex is limited to between k and 2k-1, that is, the number of entries. (keys), s equal to or greater than k and equal to or smaller than 2k-1. The value of k is any integer greater than or equal to 2 (k≧2), although for purposes of explanation:, the tree will be described where k=2, so that each hierarchy and bottom vertex in the example has 2 (k) or 3 (2k-I) entries. It will be appreciated that the value of k may be greater than 2. Thus, if k=3, the minimum number of entries in a vertex is 3 and the maximum is 5. Moreover, while the value of k is the same for all vertices of a given level, the value of k may be different for vertices of different levels.

The keys 50 in bottom vertices 20–34 are shown in an ascending order from left to right across FIG. 1 such that the key with the lowest address (e.g., "0") appears in bottom vertex 20 and the key with the highest address (e.g., "4212") appears in bottom vertex 34. Noteworthy, however, the addresses of the vertices need not be in the same ascending order. Instead, the bottom vertices are arranged in an order ascending from one to V, equal to the number of bottom vertices. In the example, V=8, since there are eight vertices in level L3. The entries 46 in the bottom vertices are arranged among the bottom vertices so that the key values of all entries in any one bottom vertex are greater than the key values all lower-ordered bottom vertices and are smaller than the key values in all higher-ordered bottom vertices. For example, the keys of vertex 26 are all higher than the keys in vertices 20, 22 and 24, and are lower than the keys in vertices 28, 30, 32 and 34, notwithstanding that vertex 26 has an address lower than any of vertices 22, 24, 28, 30, 32 and 34. The only condition on the key addresses is that they ascend through each vertex. It is not necessary that the vertices be arranged in address order for the ascending keys. Thus, as shown at level L3, the keys ascend through the bottom vertices whose addresses are 0, 7, 2, 1, 3, 5, 6 and 4. Thus, the address of vertex 34 containing the highest key address ("4214") is "4" which is actually lower than the address of other vertices of level L3 containing lower key addresses. The addresses of the hierarchy vertices also do not need to be in address order for ascending keys. Also, the actual key addresses given in the example are arbitrary and may be any key addresses as may be appropriate.

Each key is associated with data such that a search for a key, which is a designating address, will retrieve the associated data. Thus, a search for key "2133" will retrieve data R from vertex 26 whereas a search for key "3366" will retrieve data J from vertex 30.

Each parent vertex 10–18 contains entries 36 identifying the lowest value key 50 in its child vertex. Thus, vertex 10 contains a single entry (because it has a single child vertex 12) identifying the lowest value key, which is "0". Vertex 12 contains three entries (because it has three child vertices 14, 16 and 18). Each entry in vertex 12 includes the key value of the lowest value key in each respective child vertex. Similarly, vertex 14 contains the keys of the lowest value key in each bottom vertex 20, 22, 24, vertex 16 contains two entries identifying the lowest value keys of bottom vertices 26, 28 and vertex 18 contains three entries identifying the lowest value keys of bottom vertices 30, 32 and 34. Thus, each hierarchy vertex of levels L1 and L2 contains keys that are the same as the lowest value key in the child vertex of the next lower level of the respective path. The child vertex is identified by the child vertex address in field 42 of the corresponding entry. The hierarchy vertices of each level L1 and L2 are arranged in an ascending order such that the key values of all entries in any one hierarchy vertex of a level are greater than the key values in all lower-ordered hierarchy vertices of the same level and are smaller than the key values in all hierarchy higher-ordered vertices of the same level. For example, the keys of vertex 16 are all higher than the keys in vertex 14, and are lower than the keys in vertex 18. Moreover, the ordering of the keys is without regard to the addresses of the vertices of the level. Nevertheless, an inspection of the tree reveals that the group of bottom vertices containing the lowest keys (vertices 20, 22 and 24) are children of the vertex (14) having the lowest keys. Moreover, as in the case of the bottom vertices, the ordering of keys in the hierarchy vertices is without regard to the vertices addresses.

Those skilled in the art will appreciate that the tree illustrated in FIG. 1 is not a representation of a physical relationship of the memory elements containing the keys, data and other information identified in FIG. 1. Instead, FIG. 1 identifies the relationship of these elements that are stored in the computer memory, without regard to the physical position of those elements. FIG. 2 identifies the memory allocation for these elements, but again without regard to the physical position of the information in the memory.

As shown in FIG. 2, the elements stored in memory consists of the entries 36 and 46 illustrated in FIG. 1 stored in the memory at various levels. FIG. 2 actually identifies seven levels (identified as L0–L6), and is therefore larger than the tree illustrated in FIG. 1. Each level includes an interface register 60, interface logic 62 and control logic 64. The interface register 60 and logic 62 provide interface between the local logic 66 of the level and the control logic 64 of the parent level or, in the case of level L0, to input/output controls of the computer via path 68. Local registers 70 cooperate with control logic 64 to operate local logic 66 and registers 70 of the given level. In the case of hierarchy levels L1–L6, the memory also includes memory locations identified as M0–M6. For each level L1–L6, the memory locations M0–M6, contain the entries 36 illustrated in FIG. 1. Each memory location within a hierarchy level contains all entries with the same address for all vertices of that level. For example, with reference to level L2, M0 will contain the entries 36 associated with entry "0" of vertices 14, 16 and 18 shown in FIG. 1. Consequently, the contents of memory M0 identifies keys "0", "2106" and "3366". Similarly, memory M1 contains keys "1095", "2933" and "3609", etc. It will be appreciated, therefore, that with seven memory locations identified at each of levels L1–L6, the maximum number of entries 36 for a given vertex is seven. Therefore, for a tree arranged in the memory allocation of FIG. 2, the hierarchy vertices have k=4.

At bottom level L6, the operation is similar, except memory locations are larger because of the data fields contained therein. Additionally, level L6 identifies eleven memory locations, identified as memory M0 to memory M10. Consequently, the maximum capacity of the vertices of level L6 is eleven entries, so K=6.

FIG. 2 illustrates that the size of the search tree is limited only by memory allocation. Moreover, different levels may have different values of k. Thus, in FIG. 2, the memory limits the size of the table of FIG. 1 to eight levels, and k=4 for the hierarchy levels L1–L5 and to k=6 for bottom level L6.

The present invention is carried out by a computer system having a computer readable storage medium, such as a hard disk drive. A computer readable program code is embedded in the medium and contains instructions that cause the computer to carry out the functions of the tree, including search, insert and delete functions. In performing a search function, an input or search key IK is inserted into the root vertex, identified as ROOT_VRT. Each iteration of the process has a vertex VRT and an integer COUNT. The initial vertex VRT is a HIERARCHY_VRT, which is the child of the ROOT_VRT, and the initial COUNT is the counter of the root vertex. The instructions to the computer are as follows:

If VRT is HIERARCHY_VRT, then:
    find maximal i, for i≧0 and i<COUNT, for which (key[i] <IK), or (key[i] ==IK) is true
    set VRT=*child[i], COUNT=counter[i].

If VRT is BOTTOM_VRT, then:
    For all i, where i>0 and i<COUNT, check condition of key[i]==IK. If condition is true for some i, return (true,data[i]). If condition is false for all possible i, return <false,0>.

Referring to FIG. 1, an exemplary search may be conducted, such as for key "2133", by entry of a search query for key "2133" to root vertex 10. Since "2133" is greater than "0", the search continues to the address of the next level designated by address 42, which is the single vertex 12 of level L2. The tree selects entry that contains the highest-value key having a lower value than the search key. Thus, since the search key "2133" is greater than key "2106" at entry address "1" but smaller than key "3366" at entry address 2, the entry 36 with address "1" at vertex 12 is selected. This entry "points" to vertex address "1" in level L2, which is vertex 16 in the example. At vertex 16, since search key "21331" is larger than key "2106" and smaller than key "2933", the entry "pointing" to vertex address "1" is selected and the process continues to bottom vertex 26 where key "2133" is located. Since the key[i] is found, the condition is true and data R is read out in the usual manner. Had key "2133" not appeared in a bottom vertex, the return would be false, indicating that the key is not present.

In reference to FIG. 2, search is accomplished though the interface registers and logics 60 and 62 operating with local logics 66 and local registers 70 to "drill down" though control logic 64 and the interface of the next level down, until reaching the appropriate memory location in the When a key is inserted or deleted into one of the bottom vertices, the table of FIG. 1 may need to be adjusted. Adjustment of the table is accomplished in the memory illustrated in FIG. 2. FIG. 3 illustrates the process of deleting key "3609" which appears in bottom vertex 32 (FIG. 1). In this case, key "3609" and its data G are deleted and key "3636" is re-designated into address "0". Key "3639", together with its associated data E, is transferred from vertex 34 to vertex 32. The entries in vertex 18 are adjusted to indicate key "3636" at address "1" and key "3645" at address "2" (the entry at address "0" is unchanged). Additionally, since vertex 34 now has two entries (instead of three), the number of entries in field 44 in vertex 18 is reduced to "2".

FIG. 4 illustrates the condition where a bottom vertex may be completely deleted due to deleting a single entry. This example starts with the tree as configured in FIG. 3, and describes the process of deleting key "3639" that is in vertex 32. In this case, vertex 32 would seemingly have a single entry, which violates the rule that there be at least k number of keys in a vertex. Since, for the present example k=2, vertex 32 would violate the rule with only one entry. To meet the requirement that k=2, key "3609" is transferred from vertex 32 to vertex 30. The key identifications are adjusted to identify the minimum keys of vertices 30 and 34. Since parent vertex 18 now only has two child vertices, the number of entries infield 44 in parent vertex 12 is reduced to "2".

FIGS. 5 and 6 illustrate the process of deleting an entry from a bottom vertex having the minimal k entries (as in FIG. 4), but where the neighbor vertex has the maximum number of entries is (2k−1). FIG. 5 illustrates the initial condition of the tree with bottom vertex 30 containing three entries. In the example where k=2, bottom vertex contains the maximum number of entries. The process of deleting the entry containing "3639" from vertex 32 in FIG. 5 begins with deleting the entry. Instead of transferring the entry containing "3636" to vertex 30 (which would create a rule violation), the entry address 48 for key "3636" is changed from "0" to "1" and the entry (i.e., key "3588") at address "2" in vertex 30 is changed to address "0" in vertex 32. The count in field 44 in vertex 18 is reduced by one to reflect the transfer of an entry. Key "3588" is copied to address "1" in vertex 18.

The code for performing the deletion process first identifies the entry to be deleted and the bottom vertex to which it belongs. The COUNT (field 44 in the parent vertex associated with the selected bottom vertex) decrements by one and set to COUNT (COUNT=COUNT−1).

If COUNT≧k (i.e., the new COUNT=2 in the example), the entry is simply deleted from the bottom vertex, (e.g., vertex 32 in FIG. 3, and the COUNT (e.g., 2) is retained at 44 in the parent hierarchy vertex 18. If the key being deleted is the minimum key in the vertex, the next higher key assumes the entry address "0" and is copied into the parent vertices as required.

As shown in FIG. 4, if COUNT<k (i.e., the new COUNT=1), the remaining entry(s) (i.e., "3636" in the example of FIG. 4) in the existing bottom vertex 32 is merged into the bottom vertex containing the next higher entry value (e.g., vertex 30, and vertex 32 is deleted. The count in vertex 30 is incremented by 1. If, the count in vertex 30 is COUNT<2k (i.e., COUNT=3), the new count is saved at field 44 in hierarchy vertex 18. Additionally, the entry for bottom vertex 32 is deleted from vertex 18, and its count is reset in field 44 in vertex 12.

FIGS. 5 and 6 illustrate the deletion process where bottom vertex 30 contained 2k−1 entries such that its COUNT would be COUNT=2k (i.e., COUNT=4) if key "3636" were added by the process of FIG. 4. In this case, the remaining entry in vertex 32 (e.g., "3636") remains in vertex 32 and the bottom or maximum entry (e.g., "3588" from vertex 30 is transferred to the minimum entry for vertex 32. This reduces the count of vertex 30 to 2k−2 (i.e., 2), and brings the count of vertex 32 to k=2. Thus where k=2, the COUNT for vertices 30 and 32 are both 2, and field 44 in parent vertex 18 is changed is change for vertex 30. Additionally, the new minimum entry value (i.e., "3588" for bottom vertex 32 is inserted into the appropriate entry 36 of parent vertex 18.

The computer instructions for performing a delete begin with input of a key IK to be deleted.
If VRT is BOTTOM_VRT, then
 for all i, where i≧0 and i<COUNT, check condition of key[i]==IK
 if for all i, condition is false, (indicating IK is not in the set of keys), end the process
 if for any i, condition is true, the key IK is deleted from list.

The deletion instructions begin by setting a key j to be deleted. NEW_KEY is the key for which the counter is modified and NEW_COUNT is the value of the modified counter.
 set COUNT=COUNT−1;
 for (j=i; j<COUNT; j++)
  {key[j]=key[j+1]; data[j]=data[j+1]};
 set NEW_COUNT=COUNT and NEW_KEY=key[0].
VRT is HIERARCHY VRT, a search is conducted for the minimal valid i for which key[i]==NEW_KEY or is >NEW_KEY. For that key
 set key[i]=NEW_KEY; counter[i]=NEW_COUNT.
 choose a valid index j from {i−1 and i+1}
  if both i−1 and i+1 are valid, choose j with a value counter[j] equal to the minimum from counter[i−1] and counter[j+1];
  if only i−1 is valid, j=i−1;
  if only i+1 is valid, j=i+1;
  (condition that neither i−1 nor i+1 is valid is not possible).
 set m=min(i,j), then {i,j}={m,m+1}
 set UNION_COUNT=counter[m]+counter[m+1],
 for (j=0;j<counter[m];j++)
  {newkey[j]=child[m]→key[j];
  newcounter[j]=child[m]→counter[j];
  newchild[j]=child[m]→→child[j]; }
 for (j=counter[m]; j<UNION_COUNT; j++)
  {newkey[j]=child[m+1]→key[j-counter[m]];
  newcounter[j]=child[m+1]→counter[j-counter[m]];
  newchild[j]=child[m+1]→child[j-counter[m]]}
If (UNION_COUNT>2k−1), split the list into two parts, with the size of each part at least k. Then
 for (i=0; i<m, i++)
  {child[m]→key[i]=newkey[i];
  child[m]→counter[i]=newcounter[i];
  child[m]→child[i]=newchild[i];}
 for (i=0; i<UNION_COUNT−k; i++)
  {child[m+1]→key[i]=newkey[i+k];
  child[m+1]→counter[i]=newcounter[i+k];
  child[m+1]→child[i]=newchild[i+k];}
 let counter[m]=k;
 counter[m+1]=UNION_COUNT−k;
 key[m+1]=newkey[k]; NEW_COUNT=COUNT;
 NEW_KEY=key[0].
If (UNION_COUNT≦2k−1), join vertices k and k+1 into one vertex. Then
 for (j=counter[k]; j<UNION_COUNT; j++)
  child[m]→key[i]=newkey[i];
  child[m]→counter[i]=newcounter[i];
  child[m]→child[i]=newchild[i];}
  counter[m]=UNION_COUNT.
To destroy child vertex m+1, do
 COUNT=COUNT−1
  for (i=m+1;i<COUNT;i++)
   {child[i]=child[i+1];
   counter[i]=counter[i+1];
   key[i]=key[i+1]}
 set NEW_COUNT=COUNT; NEW_KEY=key[0]
With the new count and new key established, root editing is performed. If the child vertex of the root has at least two valid indexes or is a BOTTOM_VRT, the process is ended.

If the child vertex is a HIERARCHY VERTEX and the counter of the root is equal to 1, do
  child=child→child[0];
  counter=child→counter[0];
  delete the child and end.

FIG. 7 illustrates a process of inserting a key into the tree. Here, the intent is to insert a key IK and its corresponding data ID into the tree. The process commences by conducting a search, as described above, for the key IK. If it is found, the data ID is inserted into the corresponding entry for key IK in the corresponding bottom vertex and the process ends. If the key is not found, a process for inserting key is initiated. FIG. 7 sets forth the example of inserting key "1099" and its associated data "B" into the tree at vertex 22. As shown at FIG. 1, bottom vertex 22 had two entries, which is less than 2k−1. Key "1099" and its data B are inserted at entry 1 in vertex 22, moving key "1107" and its data W to entry 2. The number of entries 44 for vertex 22 is adjusted to "3" at field 44 at address 7 in vertex 14. The insertion illustrated in FIG. 7 is a simple insertion, requiring very little restructuring of the tree. FIGS. 8–10, however, illustrate more complex insertion processes to insert a key into a vertex that already contains a maximum number of entries.

FIG. 8 illustrates a tree, similar to the tree of FIG. 1, except that vertices 18 (level L2) and 30, 32 and 34 (level L3) are omitted and vertex 12 (level L1) contains two entries. FIG. 9 illustrates a process of inserting key "1583" into the tree of FIG. 8, which would be inserted into bottom vertex 24. However, the insertion of key "1583" into vertex 24 would violate the rule that the vertex can be no larger than 2k−1 entries. Indeed, the condition of vertex 24 would become 2k−1+1, which is equal to k+k. Because no other rule violations will occur, it is preferred in this case to split vertex 24 to create a new bottom vertex 62. Each of vertices 24 and 62 then has two entries. The minimum entry for vertex 62 is key "1458" and the minimum entry for vertex 24 is key "1701".

At the parent hierarchy vertex 14, an attempt to insert the entry for vertex 62 would, of course, violate the rule of maximum entries, so vertex 14 is split to create a new hierarchy vertex 64 containing the two entries, one each for vertices 62 and 24. Vertex 14 is adjusted to remove the key designation "1458" of vertex 24 and reduce the count of field 44 in vertex 12 to "2". With new vertex 64 created, key "1458" is added to vertex 12.

FIG. 10 illustrates another process of inserting key "1583" to the tree, this time starting with the tree illustrated in FIG. 1. It will be appreciated that applying the process of FIGS. 8 and 9 to this example will result in a violation of the rule that the root vertex contain a single entry, and that only one vertex appear in level L1. More particularly, if key "1583" were added to vertex 24 in FIG. 1, and vertex 24 were split as described in connection with FIGS. 8 and 9, the new vertex to level L2 would mean there are four vertices in level L2. Consequently, vertex 12 in level L1 would need four entries to "point" to the four vertices of level L2, which would violate the rule on maximum entries (assuming k=2). Vertex 12 cannot itself be split as described in FIGS. 8 and 9 because to do so would require vertex 10 to have two entries which violates the rule that the root vertex have a single entry. In this case, the preferred technique is to transfer one entry from vertex 24 to vertex 22, as shown in FIG. 10. Consequently, key "1458" is transferred to entry address "2" in vertex 22, and new entry "1583" is added as the minimum value key to entry address "0" in vertex 24. The key identification at entry address "2" in parent vertex 14 is changed to "1583".

If the condition occurs that vertices 20 and 22 are also filled to capacity, a new key entry to vertex 24 could generate a series of transfers of the keys with the highest address to bottom vertices to the right of vertex 24 (in FIG. 1). This procedure would be followed until a bottom vertex is found having less than 2k−1 entries. If no bottom vertex is found having less than 2k−1 entries, the procedure is repeated at the next level up until a vertex is found in level L2 having less than 2k−1 entries (such as vertex 16). The process continues up the tree until a vertex is found permitting restructure of the tree.

The code to perform an insertion operation begins with checking the new entry to identify the position for the new entry in the bottom vertices. The candidate bottom vertex for the new entry is selected by comparing the value of the new entry to the values of the existing entries i, where $0<i<COUNT_{TOTAL}$ and $COUNT_{TOTAL}$ is the total COUNT of all bottom vertices. The COUNT of the selected bottom vertex is incremented by one and set to COUNT (COUNT=COUNT+1).

If, for the candidate vertex (i.e., vertex 24 in the example), the new COUNT<2k (i.e., the new COUNT≦3), then the new entry is allocated to the selected bottom vertex, as illustrated in FIG. 7, and the COUNT is retained at field 44 in the parent hierarchy vertex 14.

If, for the candidate vertex (i.e., vertex 24 in the example), COUNT=2k (i.e., the new COUNT=4), then the existing bottom vertex 24 is split forming a new bottom vertex 62, as illustrated in FIG. 9. The new entry is allocated to the new bottom vertex 62, together with such existing entries that includes either the maximum or minimum existing entries for k entries. The COUNT for the new vertex 62 is set to k (which in the present example is 2). The count for the existing vertex (i.e., vertex 24) is set to 2k−2 (which in the present example is 2). The process is repeated at the hierarchy vertex, as shown in FIG. 9, to create new hierarchy vertices, such as vertex 64. The new COUNTS for child vertices 24 and 64 are inserted the parent hierarchy vertex 64, and an entry is added to parent vertex 12.

Only if no re-structure of the tree can occur within the branch to which the key is inserted will the tree control go outside the branch and transfer keys to bottom vertices outside the direct parent to which the new key is added.

The computer instructions for performing an insert begin with input of a pair IK and ID, representing the key and data to be inserted. Initially, COUNT=1.
  If VRT is BOTTOM VRT, then,
  for all i, where i≧0 and i<COUNT, check condition of key[i]==IK
  if for some i, condition is true, set data[i]=ID and end
  if condition is false for all i, insert IK,ID into list.
The insertion instructions are directed to inserting a new key j (herein key[j]) and new data[j] (herein data[j]) into a bottom vertex, where j is a valid key and j<i.
  set COUNT=COUNT+1;
  for (j=0;j<i+1;j++)
    {newkey[j]=key[j];
    newdata=data[j];};
    newkey[i+1]=IK, newdata[i+1]=ID;
  for (j=i+2; j<COUNT;j++)
    {newkey[j]=key[i−1];
    newdata[j]=data[i−1]}
  if (COUNT<2k), then for (i=0;i<COUNT;i++)
    {key[i]=newkey[i];
    data[i]=newdata[i];}
      set NEW_VRT=NULL; NEW_COUNT=COUNT;
      NEW_KEY=key[0];

if (COUNT==2k) a new bottom vertex is allocated:
NEW_VRTL new BOTTOM_VRT( );
NEW_COUNT=m; NEW_KEY=newkey[m];
   for the current vertex VRT,
      for (i=0; i<NEW_COUNT;i++)
         {key[i]=newkey[i];
         data[i]=newdata[i];}
   for the new vertex *NEW_VRT,
      for (i=0; i<NEW_COUNT;i++)
         {key[i]=newkey[i+m];
         data[i]=newdata[i+m];}

Similarly, for the hierarchy vertices, while VRT is HIERARCHY VRT, the condition of key[i]==NEW_KEY is checked for all valid i. If the condition is true, set counter [i]=NEW_COUNT and end insert operation. If condition is false for all i, then set COUNT=COUNT+1;
for (j=0;j<+1;j++){newkey[j]=key[j];
   newcounter=counter[j];
   newchild[j]=child[j];}
newcounter[i]=NEW_COUNT;
newkey[i+1]=NEW_KEY;
newcounter[i+1]=NEW_COUNT;
NEWCHILD[i+1]=NEW_VRT;}
for (j=i+2; j<COUNT;j++)
   {newkey[j]=key[i−1];
   newcounter[j]=counter[i−1];
   newchild[j]=child[i−1]};
if (COUNT<2k), then for (i=0;
i<COUNT;i++){key[i]=newkey[i];
counter[i]=newcounter[i];
child[i]=newchild[i]};
   set NEW_VRT=NULL; NEW_COUNT=COUNT;
      NEW_KEY=key[0];
if (COUNT==2k) a new hierarchy vertex is allocated:
NEW_VRT=new HIERARCHY_VRT( );
NEW_COUNT=m; NEW_KEY=newkey[m];
   For the current vertex VRT, do
      (i=0; i<NEW_COUNT;i++)
      {key[i]=newkey[i];
      counter[i]=newcounter[i];
      child[i]=newchild[i]}
   For the new vertex *NEW_VRT, do
      (i=0; i<NEW_COUNT;i++)
      {key[i]=newkey[i+m];
      counter[i]=newcounter[i+m];}

If the vertex is the root vertex, then if NEW_KEY== key_zero, set counter=NEW_COUNT and end the operation. If NEW_KEY≠key_zero, set counter=0;
old_child=child;
child=new HIERARCHY VRT.
For the new hierarchy vertex, do
key[0]=zero_key; key[1]=NEW_KEY;
counter[0]=NEW_COUNT; counter[1]=NEW_COUNT;
child[0]=old_child; child[1]-NEW_VRT.

The present invention thus provides a structured binary search tree that has a predictable delay during search operations based on the number of vertices in the path between the root vertex and the sought-for key in a bottom vertex. Since all paths are equal in number of vertices, the tree exhibits all of the favorable attributes of balanced trees, including predictable delays. More particularly, like balanced trees, the worst-case time delay is O(log n), where n is the number of vertices in the tree. Moreover, insertion and deletion techniques are simple, avoiding complex procedures associated with balanced search trees which led to limitations in the size of the search table. Consequently, larger search trees and tables are possible using the structure of the present invention.

Although the present invention has been described with reference to preferred embodiments, workers skilled in the art will recognize that changes may be made in form and detail without departing from the spirit and scope of the invention.

What is claimed is:

1. A computer readable medium containing an expandable and/or contractible binary search tree for conducting a search for a key associated with data in a computer database, the search tree having a plurality of vertices arranged in a plurality of levels with a bottom level containing a plurality of bottom vertices each containing at least k, and no more than 2k−1, entries, where k is an integer $\geq 2$, each entry in a bottom vertex associating a key with data, a top level containing a root vertex defining an input to the tree, and at least one intermediate level containing a plurality of hierarchy vertices defining at least a portion of a path between the root vertex and a bottom vertex, each hierarchy vertex containing at least k, and no more than 2k−1, entries, each entry in a hierarchy vertex comprising a key contained in a bottom vertex entry and a vertex address of a lower level vertex to define a portion of the path between the root vertex and the bottom vertex containing the key, the keys in each level being distributed through the vertices of the respective level in a predetermined order.

2. The computer medium of claim 1, wherein the tree is further characterized in that all of the paths between the root vertex and each of the bottom vertices are substantially equal in length.

3. The computer medium of claim 2, wherein the hierarchy and root vertices each contains a plurality of entries each containing the key of a respective vertex of the next lower order having a minimum value in the predetermined order.

4. The computer medium of claim 1, wherein the hierarchy and root vertices each contains a plurality of entries each containing the key of a respective vertex of the next lower order having a minimum value in the predetermined order.

5. The computer medium of claim 1, wherein the hierarchy and root vertices each contains a plurality of entries each containing the key of a respective vertex of the next lower order having a minimum value in the predetermined order.

6. The computer medium of claim 1, wherein the bottom vertices are arranged in an order ascending from one to V, where V is an integer equal to the number of bottom vertices, and the entries in the bottom vertices are arranged among the plurality of bottom vertices so that values of the keys of all entries in any one bottom vertex are greater than values of the keys in all lower-ordered bottom vertices and are smaller than values of keys in all higher-ordered bottom vertices.

7. The computer medium of claim 6, wherein each entry in the hierarchy vertices contains a key that is the same as the key in the entry with a minimum value in the vertex of the next lower level of the respective path, the hierarchy vertices of each level being arranged in an ascending order so that the key values of all entries in any one hierarchy vertex of a level are greater than the key values in all lower-ordered hierarchy vertices of the level and are smaller than the key values in all hierarchy higher-ordered vertices of the level.

8. The computer storage medium of claim 1, further including:

means for adding and/or deleting entries in the bottom and hierarchy vertices and for adding and/or deleting bottom and hierarchy vertices so that the keys in each level remaining after adding and/or deleting entries are in the predetermined order and each bottom and hierarchy vertex contains at least k, and no more than 2k−1, entries.

9. A process for altering a structured binary search tree in a computer of the class having a plurality of vertices arranged in a plurality of levels with a bottom level containing a plurality of bottom vertices each containing a plurality of keys and associated data, a top level containing a root vertex defining an input to the tree, and at least one intermediate level containing a plurality of hierarchy vertices defining at least a portion of a path between the root vertex and a bottom vertex, with each hierarchy vertex containing a plurality of entries comprising a key contained in a bottom vertex entry and a vertex address of a lower level vertex to define a portion of the path between the root vertex and the bottom vertex containing the key, the search tree being structured such that keys are distributed though the vertices of each level in a predetermined order, the process comprising steps of:

a) altering the number of keys in at least one bottom level vertex;

b) identifying the number of keys in the altered bottom level vertex, and either c) if the identified number of keys is less than k, where k is an integer $\geq 2$, adjusting the location of keys among the bottom vertices until all bottom vertices contain no less than k keys; and d) if the identified number of keys is greater than 2k−1, transferring a key from the adjusted bottom vertex to another bottom vertex until all bottom vertices contain no more than 2k−1 keys.

10. The process of claim 9, wherein step (c) includes steps of:

(c1) identifying a bottom vertex that contains more than k keys, the identified bottom vertex neighboring the adjusted bottom vertex; and (c2) transferring a key from the identified neighboring bottom vertex to the adjusted bottom vertex.

11. The process of claim 10, wherein step (c) further includes steps of:

(c3) identifying that no bottom vertex that contains more than k keys;

(c4) transferring the keys remaining in the adjusted bottom vertex to at least one neighboring bottom vertex so that the number of keys in the neighboring bottom vertex contain no more than 2k−1 keys; and (c5) deleting the adjusted bottom vertex.

12. The process of claim 11, wherein step (c) further includes steps of:

(c6) adjusting the location of keys among the hierarchy vertices until all hierarchy vertices contain no less than k keys, where k is an integer $\geq 2$.

13. The process of claim 9, wherein step (c) includes steps of:

(c1) identifying that no bottom vertex that contains more than k keys;

(c2) transferring the keys remaining in the adjusted bottom vertex to at least one neighboring bottom vertex so that the number of keys in the neighboring bottom vertex contain no more than 2k−1 keys; and (c3) deleting the adjusted bottom vertex.

14. The process of claim 13, wherein step (c) further includes steps of:

(c4) adjusting the location of keys among the hierarchy vertices until all hierarchy vertices contain no less than k keys, where k is an integer $\geq 2$.

15. The process of claim 9, wherein step (d) includes steps of:

(d1) identifying a bottom vertex neighboring the adjusted bottom vertex that contains less than 2k−1 keys; and (d2) transferring a key from the adjusted bottom vertex to the identified neighboring bottom vertex.

16. The process of claim 9, wherein step (d) includes steps of:

(d1) identifying that all bottom vertices neighboring the adjusted bottom vertex contains 2k−1 keys;

(d2) creating an additional bottom vertex;

(d3) transferring a, key from the adjusted bottom vertex to the additional bottom vertex; and (d4) transferring at least k−1 keys from at least one neighboring bottom vertex until the number of keys in the bottom vertices is between k and 2k−1.

17. The process of claim 16, wherein step (d) further includes steps of:

(d5) identifying hierarchy vertices having more than 2k−1 keys, where k is an integer $\geq 2$;

(d6) creating an additional hierarchy vertex in the same level as the identified hierarchy vertex; and (d7) transferring at least one key from the identified hierarchy vertex to the additional hierarchy vertex until the number of keys in the hierarchy vertices for the level is between k and 2k−1.

18. The process of claim 9, wherein the bottom vertices are arranged in an order ascending from one to V, where V is an integer equal to the number of bottom vertices, and the entries in the bottom vertices are arranged among the plurality of bottom vertices so that values of the keys of all entries in any one bottom vertex are greater than values of the keys in all lower-ordered bottom vertices and are smaller than values of keys in all higher-ordered bottom vertices, and step (c) comprises if the number of keys in the altered bottom vertex, v, is less than k, either transferring keys to vertex v from among vertices v−1 and v+1 and adjusting the bottom vertices until no bottom vertex contains less than k keys, or transferring keys from vertex v to among vertices v−1 and v+1, deleting vertex v, and adjusting the bottom vertices until no bottom vertex contains more than 2k−1 keys, and step (d) comprises if the number of keys in the altered bottom vertex, v, is greater than 2k−1, either transferring a key from vertex v to among vertices v−1 and v+1 and adjusting the bottom vertices until no bottom vertex contains more than 2k−1 keys, or creating a new bottom vertex v' adjacent vertex v and transferring k keys from vertex v to vertex v'.

19. A computer usable medium having a computer readable program embodied therein for addressing data, the computer readable program in the computer usable medium comprising:

computer readable program code defining a search tree having a plurality of vertices arranged in a plurality of levels with a bottom level containing a plurality of bottom vertices each containing k to 2k−1 entries each associating a key, with data, where k is a predetermined integer ≧2, a top level containing a root vertex defining an input to the tree, and at least one intermediate level containing a plurality of hierarchy vertices defining at least a portion of a path between the root vertex and a bottom vertex, each hierarchy vertex containing k to 2k−1 entries comprising a key contained in a bottom vertex entry and a vertex address of a lower level vertex to define a portion of the path between the root vertex and the bottom vertex containing the key, computer readable program code for causing a computer to insert keys into, and delete keys from, bottom vertices of the search tree, and computer readable program code for causing a computer to reconstruct the hierarchy vertices so that that the keys are distributed through the vertices of each level in a predetermined order.

20. The computer useable medium of claim 19, wherein all paths between the root vertex and each bottom vertex are substantially equal in length, the computer readable program further including:

computer readable program code for causing the computer to reconstruct the paths to substantially equal length upon insertion and deletion of keys in a bottom vertex.

21. The computer useable medium of claim 19, including computer readable program code which, when executed by a computer, cause the computer to perform steps of:

a) identifying the number of keys in a altered bottom level vertex that is altered by the insertion or deletion of at least one key, and either b) if the identified number of keys is less than k, adjusting the location of keys among the bottom vertices until all bottom vertices contain no less than k keys, and c) if the identified number of keys is greater than 2k−1, transferring a key from the adjusted bottom vertex to another bottom vertex until all bottom vertices contain no more than 2k−1 keys.

22. The computer useable medium of claim 21, including computer readable program code which, when executed by a computer, cause the computer to perform step (b) by performing steps of:

(b1) identifying a bottom vertex that contains more than k keys, the identified bottom vertex neighboring the adjusted bottom vertex, and (b2) transferring a key from the identified neighboring bottom vertex to the adjusted bottom vertex.

23. The computer useable medium of claim 21, including computer readable program code which, when executed by a computer, cause the computer to perform step (b) by performing steps of:

(b1) identifying that no bottom vertex that contains more than k keys, (b2) transferring the keys remaining in the adjusted bottom vertex to at least one neighboring bottom vertex so that the number of keys in the neighboring bottom vertex contain no more than 2k−1 keys, and (b3) deleting the adjusted bottom vertex.

24. The computer useable medium of claim 23, including computer readable program code which, when executed by a computer, cause the computer to further perform step (b) by performing steps of:

(b4) adjusting the location of keys among the hierarchy vertices until all hierarchy vertices contain no less than k keys.

25. The computer useable medium of claim 21, including computer readable program code which, when executed by a computer, cause the computer to perform step (c) by performing steps of:

(c1) identifying a bottom vertex neighboring the adjusted bottom vertex that contains less than 2k−1 keys, and (c2) transferring a key from the adjusted bottom vertex to the identified neighboring bottom vertex.

26. The computer useable medium of claim 21, including computer readable program code which, when executed by a computer, cause the computer to perform step (c) by performing steps of:

(c1) identifying that all bottom vertices neighboring the adjusted bottom vertex contains 2k−1 keys, (c2) creating an additional bottom vertex, (c3) transferring a key from the adjusted bottom vertex to the additional bottom vertex, and (c4) transferring at least k−1 keys from at least one neighboring bottom vertex until the number of keys in the bottom vertices is between k and 2k−1.

27. The computer useable medium of claim 26, including computer readable program code which, when executed by a computer, cause the computer to further perform step (c) by performing steps of:

(c5) identifying hierarchy vertices having more than 2k−1 keys, (c6) creating an additional hierarchy vertex in the same level as the identified hierarchy vertex, and (c7) transferring at least one key from the identified hierarchy vertex to the additional hierarchy vertex until the number of keys in the hierarchy vertices for the level is between k and 2k−1.

* * * * *